March 10, 1925.
M. F. ROSE
1,528,992
TYPEWRITER SCALE
Filed March 10, 1924
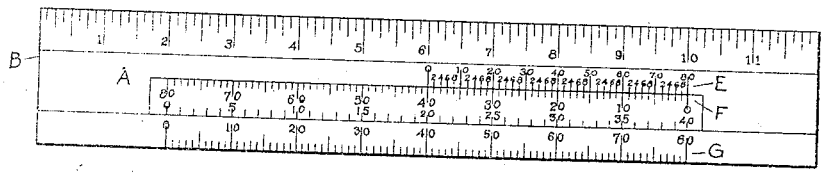 
*Fig. 1.*            *Fig. 2.*
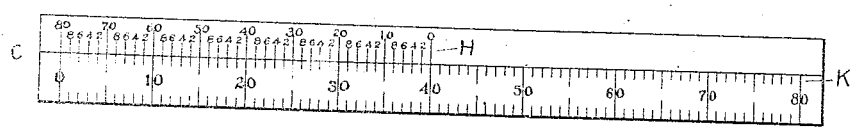
*Fig. 3.*            *Fig. 4.*
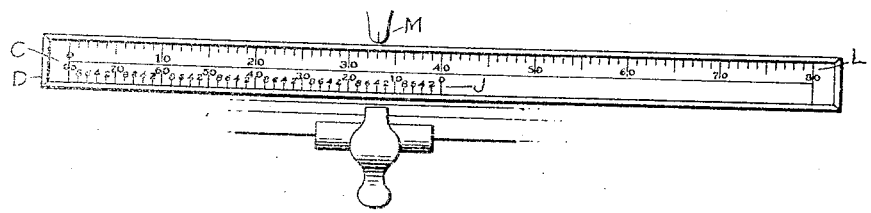 
*Fig. 5.*            *Fig. 6.*
INVENTOR.
Manuel F. Rose
BY *M. C. Frank*
ATTORNEY Patented Mar. 10, 1925.

1,529,982

UNITED STATES PATENT OFFICE.

MANUEL F. ROSE, OF OAKLAND, CALIFORNIA.

TYPEWRITER SCALE.

Application filed March 10, 1924. Serial No. 698,041.

*To all whom it may concern:*

Be it known that I, MANUEL F. ROSE, a citizen of the United States, residing at Oakland, in the county of Alameda and State of California, have invented certain new and useful Improvements in Typewriter Scales, of which the following is a specification.

My invention relates to scales, and more particularly to a scale for the use of stenographers, and has for its primary object to provide a simple and convenient device to indicate where to start typing a heading on a sheet of paper placed midway in the typewriter, so that the heading will appear in the middle of the paper with an equal margin on each side thereof.

A further object of my invention, is to so arrange the scale that it may be made either as a typewriter attachment, or for use apart therefrom. In the first-named use I prefer to adapt it to take the place of the existing scale on the machine, and for the latter use I prefer to make the scale in the form of a ruler or straight edge.

The several embodiments of the device will be more clearly understood upon reference to the accompanying sheet of drawings, in which:

Figure 1 is a plan of the scale applied to a common 12″ ruler and showing the graduations arranged for one make of typewriter; and Fig. 2 is an end view of it. Fig. 3 is a view of the scale with the graduations arranged for another make of typewriter; and Fig. 4 is an end view of it. Fig. 5 is a view of the scale as applied to the scale frame of a typewriter and Fig. 6 is a section through the same.

Referring now to the drawings in detail: A represents the scale per se, which as above stated may be applied, as shown in Figs. 1 and 2, to a ruler or straight edge B; or it may be made in the form of a relatively narrow strip C as shown in the rest of the figures, and can be made to slip in the scale frame D of a typewriter.

Insomuch as all typewriters do not have the same spaced scale graduations, it is my intention to make the scale with different graduations so that a scale may be purchased for most every make of typewriter, or at least for all of the popular makes. This difference in form accounts for the showing in Figs. 1 and 3 of the drawings.

The scale as shown in the ruler form of Fig. 1 has graduations thereon for use in conjunction, in this instance, with an Underwood typewriter. Aside from the common twelve inch divisions, which is an addition of convenience only, the scale has three series of graduations E, F and G; F being similar to the existing scale on the said typewriter, and series E in combination therewith is a modification of my invention. Series G is used to determine the number of spaces in an existing heading or collection of words on a previously typed sheet, by simply placing the rule on the said heading or words, beginning at 0 and noting the number where the length of the words terminate. And if this heading or collection of words is to be reproduced on a sheet of paper placed in the machine, simply note on series E the terminal number just found, and immediately therebelow on series F will be read the proper number where to start typing on the machine.

In Fig. 3, the strip scale shown is a form for desk use, and is to be used in conjunction with a Remington typewriter chiefly, or any machine having similar divisions.

In Fig. 5 I adapt the scale so that it may be inserted, in this instance, in the scale frame D of the last-named machine for greater convenience and efficiency.

To further elucidate: To use the scale in either form the first step is to know how many letters, characters and spaces are to be in the heading; for example, if the heading desired is "Pending matter" by counting it will be found that there are fourteen units, one space for each letter and a space between the two words. Knowing that the number of spaces is fourteen, simply read on graduation series E of Fig. 1, or series H of Fig. 3, or series J of Fig. 5, to fourteen, which will be "ten" plus sub "four". Then drop to graduations series F of Fig. 1, or series K of Fig. 3, or series L of Fig. 5, and it will be seen that the corresponding point on each of the said series will be "thirty-three." Fig. 5 shows to advantage this step as certain parts of a Remington typewriter are shown, including the stationary pointer M pointing to divison 33 directly above the determined number 14 for the said illustration "Pending matter".

Then by placing the paper in the typewriter, being sure that it is centered, start the heading at "thirty-three" on the typewriter scale and it will, without fail, leave the typed heading in the middle of the sheet.

From the drawings it will be observed that for one make of typewriter the series E will read in one direction, and for another make the equivalent series will read in the opposite direction. Should the number of spaces in a heading be odd, it will be necessary to add "one" in determining the proper point to start as indicated by the typewriter scale.

The device may be made unusually cheap and to suit any machine, and will accurately determine the proper place to start the heading on a sheet of paper, and will prove of utmost advantage in eliminating the uncertainty in guessing the proper place where to commence as now practiced.

What I claim as new and desire to secure by Letters Patent of the United States, is the following:

A scale of the class described, comprising a single strip of material having thereon a series of graduations numbered from 0 to 80 to indicate spaces in and between typewritten words, and a second series of numbered graduations adjacent the first-named series, said second series commencing at 0 and at the middle of the first series and numbered toward the 0 end of the first series, the graduations in both series being equally spaced and in alignment transversely but the second series being numerically designated by twos and separated into units of tens by a capitalized graduation, one of said series ending in number 80 at one end of the strip and the other of said series also ending in number 80 but at the opposite end of said strip.

In testimony whereof I affix my signature.

MANUEL F. ROSE.